United States Patent Office 3,232,890
Patented Feb. 1, 1966

3,232,890
POLYBORIMIDAZOLINES
Carl S. Marvel and James E. Mulvaney, Tucson, Ariz., assignors to The University of Illinois Foundation, a non-profit corporation of Illinois
No Drawing. Filed Nov. 6, 1961, Ser. No. 150,169
3 Claims. (Cl. 260—2)

This invention relates to polyborimidazolines and methods of preparing these polymers.

Broadly, we have discovered a new group of polymers known as polyarylborimidazolines. These polymers may be prodced by reacting a tetraalkyl aryl diboronate or an aryl diboronic acid with a tetraaminoaryl compound. The polymers are thermally stable and may be used to form synthetic fibers or films.

The tetraalkyl aryl diboronate or aryl diboronic acid reactant is of the general formula $$(R''O)_2B—R—B(OR')_2$$

The symbol R is an arylene group such as phenylene or ferrocenylene; and the symbols R' and R'' are alkyl groups such as butyl or hydrogen groups.

The tetraaminoaryl compound must have pairs of ortho-positioned amino groups. For example, we may use 3,3'-diaminobenzidine or 1,2,4,5-tetraaminobenzene.

Example I below shows the preparation of tetra-n-butyl benzene-1,4-diboronate as follows:

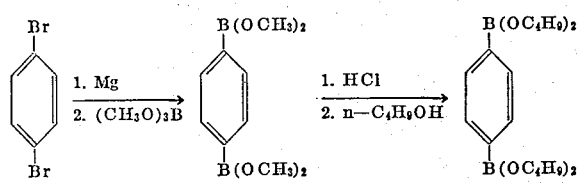

Example II below shows the preparation of tetra-n-butyl benzene-1,3-diboronate as follows:

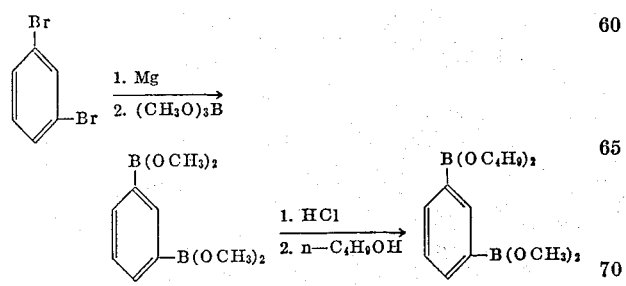

Example III below refers to the preparation of 3,3'-diaminobenzidine-(3,3',4,4'-tetraaminobiphenyl) by the following procedure:

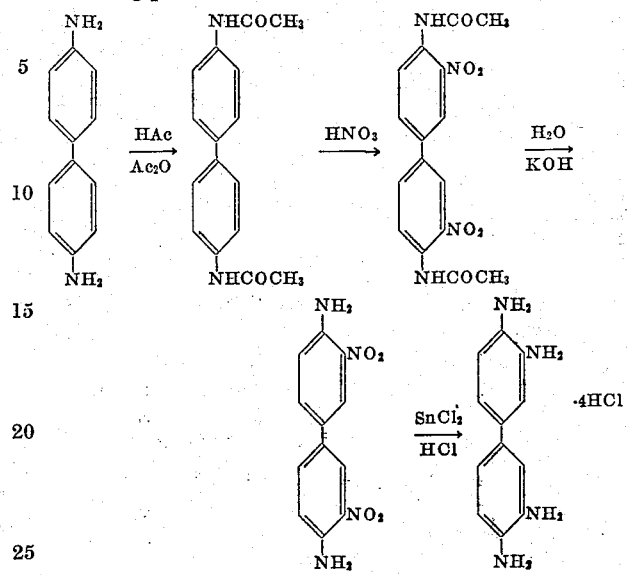

Example IV below shows the production of a polymer from tetra-n-butyl benzene-1,4-diboronate and 3,3'-diaminobenzidine as follows:

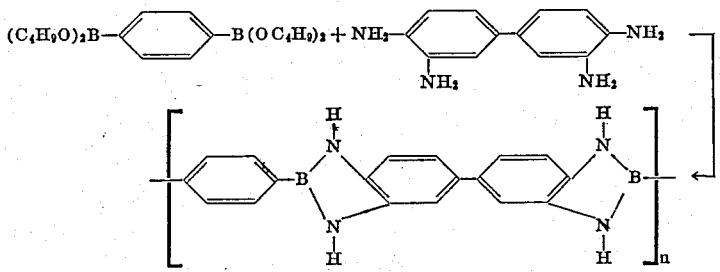

Example V below shows the production of a polymer from tetra-n-butyl benzene-1,3-diboronate and 3,3'-diaminobenzidine as follows:

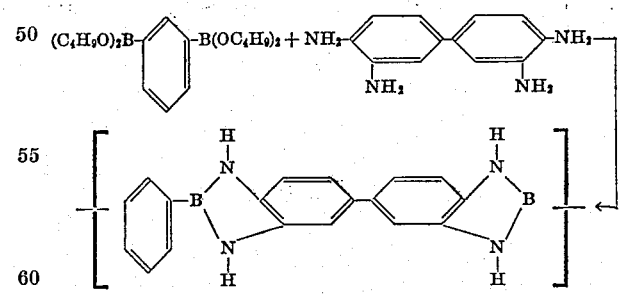

Example VI below shows the preparation of 1,1'-ferrocenylenediboronic acid from ferrocene as follows:

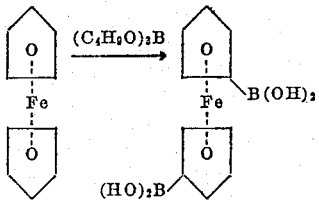

Example VII below shows the preparation of tetra-n- butyl-1,1'-ferrocenylenediboronate from 1,1'-ferrocenylenediboronic acid as follows:

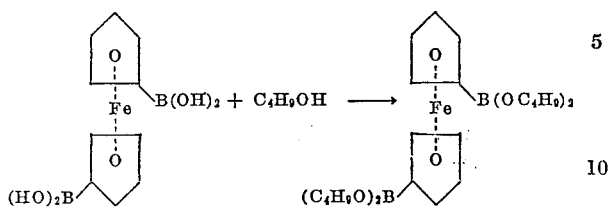

Example VIII below shows the production of a polymer from tetra-n-butyl-1,1'-ferrocenylenediboronate and 3,3'-diaminobenzidine as follows:

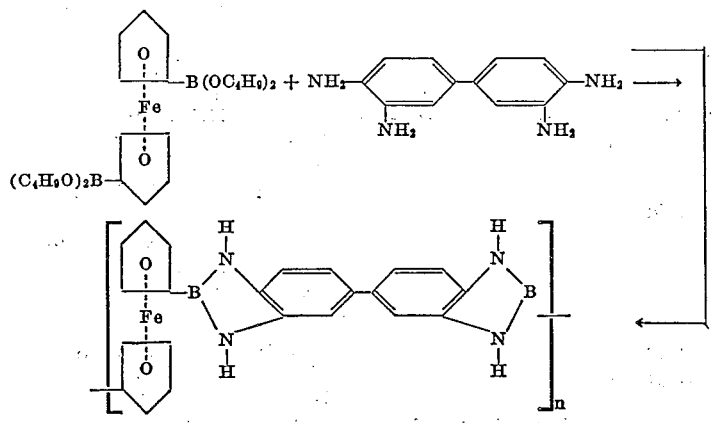

Example IX below shows the production of a polymer from 1,1'-ferrocenylenediboronic acid and 3,3'-diaminobenzidine.

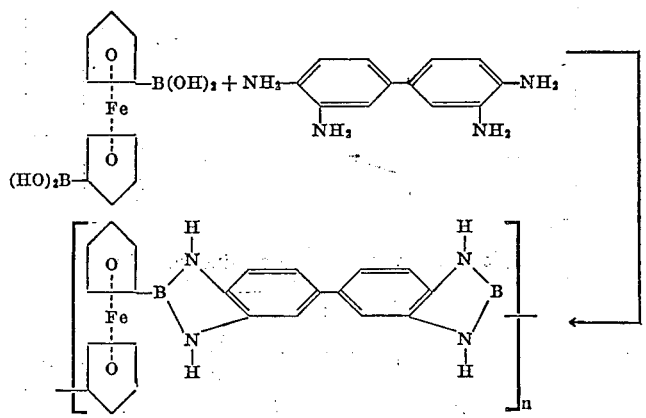

EXAMPLE I

Tetra-n-butyl benzene-1,4-diboronate, i.e.,

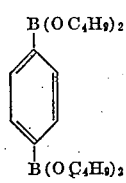

was prepared in accordance with the procedure of Nielson and McEwen set forth in J. Am. Chem. Soc., 79, 3081 (1957). The product had a boiling point of 152–162° C. (0.1 mm.), $n_D^{25}$ 1.4688.

*Analysis.*—Calculated for $C_{22}H_{40}B_2O_4$: C, 67.71; H, 10.33. Found: C, 67.50; H, 10.13.

EXAMPLE II

Tetra-n-butyl-benzene-1,3-diboronate, i.e.,

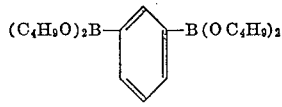

was prepared in accordance with the procedure of Nielson and McEwen referred to in Example I. The product had a boiling point of 144–146° C. (0.02 mm.), $n_D^{25}$ 1.4682±0.0003.

EXAMPLE III

The 3,3'-diaminobenzidine product, i.e., may be prepared in accordance with the general procedure reported in Hoste, Anal. Chem. Acta., 2, 402 (1948); Strakosch [Ber. 5, 236 (1872)], and Hodgson [J. Chem. Soc., 1757 (1926)].

EXAMPLE IV

A melt polymerization procedure was used to produce a polymer from tetra-n-butyl benzene-1,4-diboronate and 3,3'-diaminobenzidine. A mixture of 1.208 g. (0.0031 mole) of tetra-n-butyl benzene-1,4-diboronate and 0.7071 g. (0.0031 mole) of 3,3'-diaminobenzidine was weighed into a flask under nitrogen. Upon heating under nitrogen a reaction began to occur at about the melting point of the tetraamine (180° C.) as evidenced by the disappearance of the purple color of the amine, the distillation of n-butyl alcohol, and the formation of a white solid. Heating was continued at 250–260° C. (0.1 mm.) for 0.75 hour after which time the reaction mixture was ground to a fine powder (light tan) and heated again at 250–260° C. (0.1 mm.) for 1.5 hours. The product had an inherent viscosity of 0.35 in dimethylsulfoxide (0.048 g./100 ml., 25° C.).

*Analysis.*—Calc'd for $(C_{18}H_{14}B_2N_4)_n$: C, 70.19; H, 4.58; N, 18.19. Found: C, 66.33; H, 5.17; N, 17.41.

A portion of this polymer was heated for 0.5 hour at 590–610° C. (0.1 mm.). Except for a slight darkening it did not change in appearance. The polymer treated in this way was insoluble in dimethylsulfoxide but did dissolve slowly on warming in sulfuric acid.

The same reactants were used to produce a polymer by the following solution polymerization procedure. A solution of 3.9005 g. (0.01 mole) of tetra-n-butyl benzene-1,4-diboronate and 2.1420 g. (0.01 mole) of 3,3'-diaminobenzidine in 50 ml. of dimethylacetamide (freshly distilled from calcium hydride) was heated in an oil bath at 220–225° C. under prepurified nitrogen. A precipitate appeared within 10 minutes. The solvent and n-butyl alcohol were slowly removed by distillation over a period of 3.5 hours. After washing the residue with methanol and drying at 110° C. in vacuum there remained 2.95 g. of a light tan powder. The polymer dissolved partially in dimethylsulfoxide (hot). The minimum inherent viscosity in this solvent is 0.05, but at least 50% of the sample did not dissolve and had to be removed by filtration. The ultraviolet spectrum showed $\lambda\lambda_{max.}$ 257–268 m$\mu$ ($E^{1\%}_{1cm.}$ 315); 348 m$\mu$ ($E^{1\%}_{1cm.}$ 503)

in dimethylacetamide.

*Analysis.*—Calc'd for $(C_{18}H_{14}B_2N_4)_n$: C, 70.19; H, 4.58; N, 18.19; B, 7.04. Found: C, 70.14; H, 4.85; N, 18.32; B, 6.96.

EXAMPLE V

A melt polymerization procedure was used to produce a polymer from tetra-n-butyl benzene-1,3-diboronate and 3,3'-diaminobenzidine. A flask containing 1.9515 g. (0.005 mole) of tetra-n-butyl benzene-1,3-diboronate and 1.0713 g. (0.005 mole) of 3,3'-diaminobenzidine was heated at 150° C. under nitrogen. Over a period of one hour the temperature was increased to 210° C. and n-butyl alcohol began to distill. Heating was continued for an additional 0.5 hour at 0.01 mm. After cooling and grinding to a fine powder the residue was reheated in vacuum for 3.5 hours while increasing the temperature from 200–290° C. The yield of off-white powder was 1.4 g. It was soluble in dimethylsulfoxide, methyl pyrrolidone, hexamethylphosphoramide, dimethylacetamide, dimethylformamide and sulfuric acid. The polymer had an inherent viscosity of 0.15 in dimethylsulfoxide (0.63 g./100 ml. at 30° C.). After standing for several days in a closed bottle the sample turned brown.

The same reactants were used to produce a polymer by the following solution polymerization procedure. A solution of 3.9037 g. (0.01 mole) of tetra-n-butyl benzene-1,3-diboronate and 2.1432 g. (0.01 mole) of 3,3'-diaminobenzidine in 50 ml. of dimethylacetamide (freshly distilled from calcium hydride) was heated in an oil bath at 220–225° C. under prepurified nitrogen. The solvent and n-butyl alcohol distilled slowly over a 4 hour period through a vacuum jacketed, 10 inch Vigreux column, B.P. 149–162° C. The pressure was gradually reduced to 30 mm. over a period of 0.5 hour and finally to 0.1 mm. for 0.75 hour. During the latter period the temperature of the reaction mixture was lowered to 200–210° C. The residue was a very light yellow foamy solid. When the flask cooled to room temperature the adhesive polymer cracked the flask, and adhered very strongly to the glass fragments. The product was dissolved in dimethylformamide and reprecipitated into methanol. After 12 hours of drying at 110° C. there was obtained 2.8 g. of a white powder. The polymer was soluble in dimethylsulfoxide, dimethylacetamide, N-methylpyrrolidone and sulfuric acid. The inherent viscosity was 0.16 (0.20 g./100 ml. in dimethylacetamide at 30° C.), $\lambda\lambda_{max.}$ 326 m$\mu$ ($E^{1\%}_{1cm.}$ 1140)

in dimethylacetamide (0.16%)-ethanol.

Evaporation of solvent from a dimethylacetamide solution of this polymer on a mercury surface gave a transparent film which was somewhat flexible but brittle.

*Analysis.*—Calc'd for $(C_{18}H_{14}B_2N_4)_n$: C, 70.19; H, 4.58; N, 18.19; B, 7.04. Found: C, 69.98; H, 4.80; N, 18.00; B, 7.18.

EXAMPLE VI 1,1'-ferrocenylenediboronic acid was prepared from ferrocene in accordance with the following procedure.

To a stirred solution of ferrocene (27.9 g., 0.15 mole) in 300 ml. of anhydrous tetrahydrofuran was added a filtered solution of butyllithium prepared from 15 g. (2.16 g. atom) of lithium and 123 g. (0.9 mole) of 1-bromobutane in 300 ml. of anhydrous ether. The resulting solution was stirred at 25° C. for 5 hours and then added over a period of 3 hours to a stirred solution of 240 g. (1.04 mole) of n-butyl borate in 150 ml. of ether at −70° C. The reaction mixture was then worked up as described by Schecter and Helling in J. Org. Chem., 26, 1034 (1961). Ether extraction of the mixed boronic acids for four days gave 1,1'-ferrocenylenediboronic acid as an orange solid, 16.5 g. (40%), M.P. 179–185° dec. (see J. Org. Chem., 26, 1034 (1961)), dec. ~200° (see publication by Nesmeyanov, Sazonova and Drozd, Doklady Akad. Nauk S.S.S.R., 126, 1004 (1959)); dec., 180°.

EXAMPLE VII

Tetra-n-butyl-1,1'-ferrocenylenediboronate was prepared from the 1,1'-ferrocenylenediboronic acid as follows.

1,1'-ferrocenylenediboronic acid (6.2 g.) was heated under reflux with 70 ml. of n-butyl alcohol. The distillate was removed slowly through a 10 inch vacuum jacketed Vigreux column fitted with a variable take-off head until the head temperature reached 113° C. After removal of the excess n-butyl alcohol at 30 mm., the mixture was maintained under a vacuum of 0.02 mm. for 36 hours. Attempted crystallization or distillation was not successful. The impure ester was used in this condition for the polymerizations.

*Analysis.*—Calc'd for $C_{28}H_{44}B_2FeO_4$: C, 62.69; H, 8.90. Found: C, 59.94; H, 8.42.

The infrared spectrum showed no bends in the O—H region.

EXAMPLE VIII

A polymer was prepared from tetra-n-butyl-1,1'-ferrocenylenediboronate and 3,3'-diaminobenzidine as follows:

A mixture of 2.4955 g. (0.005 mole) of crude tetra-n-butyl-1,1'-ferrocenylenediboronate and 1.0713 g. (0.005 mole) of 3,3'-diaminobenzidine were heated at 210–230° C. under prepurified nitrogen for 2.5 hours. The dark brown mixture gradually turned lighter as n-butyl alcohol began to distill and solid began to form. With the temperature maintained at 230° C. the pressure was lowered to 0.05 mm. for 1 hour. An orange solid collected on the condenser walls which was collected (0.2 g., 25%) and identified as ferrocene, M.P. 174–176° C. A mixed M.P. with authentic ferrocene was 174–176° C. After cooling to room temperature 2.5 g. of polymer was removed and ground to a fine powder which was heated at 230–285° C. for 1 hour at 0.05 mm. A further small quantity of ferrocene collected on the condenser. The polymer was soluble in dimethylsulfoxide (warm), dimethylacetamide, N-methylpyrrolidone (turns black) and concentrated sulfuric acid. The inherent viscosity was 0.13 (0.20 g./100 ml. at 30° C.) in dimethylacetamide.

*Analysis.*—Calc'd for $(C_{22}H_{18}FeB_2N_4)_n$: C, 63.53; H, 4.36; N, 13.47; B, 5.20. Found: C, 63.35; H, 4.63; N, 13.76; B, 4.93.

EXAMPLE IX

A polymer was prepared from 1,1'-ferrocenylenediboronic acid and 3,3'-diaminobenzidine as follows.

A suspension of 2.7369 g. (0.01 mole) of 1,1'-ferrocenylenediboronic acid and 2.1426 g. (0.01 mole) of 3,3'-diaminobenzidine in 50 ml. of toluene was heated under reflux under nitrogen for 48 hours. Water was removed by means of a Dean-Stark trap. Excess toluene was removed by distillation, and the residue was heated at approximately 100° C. overnight under vacuum. The bright orange residue dissolved in dimethylsulfoxide or dimethylacetamide. In the latter solvent the inherent viscosity was 0.15 (0.2 g./100 ml. at 30° C.). A solution of the polymer in 40 ml. of dry dimethylacetamide under nitrogen was heated under reflux for one hour. The cooled reaction mixture was filtered to remove 0.2 g. of an orange residue. The filtrate was then poured into 400 ml. of methanol to precipitate the polymer. One g. of tan powder was obtained after filtration with an inherent viscosity of 0.09 (0.2 g./100 ml. in dimethylacetamide at 30° C.), λλ max. 271 mμ ($E_{1cm}^{1\%}$ 320); 330 mμ ($E_{1cm}^{1\%}$ 638)

in dimethylacetamide.

*Analysis.*—Cal'd for $(C_{22}H_{18}FeB_2N_4)_n$: C, 63.53; H, 4.36; N, 13.47; B, 5.20. Found: C, 63.26; H, 4.51; N, 13.71; B, 5.68.

The properties of the polymers produced in the above examples are shown in Table I.

*Table I*

BENZBORIMIDAZOLINE POLYMERS

|  | Reaction conditions | Soluble in[a] | M.P., deg. | Inherent viscosity | λmax. mμ |
|---|---|---|---|---|---|
| Polymer I of Example IV. | Melt polymerization___ Polymerization in dimethylacetamide. | DMSO_____ Partially sol. in DMSO___ | >610 | 0.35 >0.05 | 257–268; 348 |
| Polymer II of Example V. | }Melt polymerization___ | DMSO, MP, HMPA, DMAC, DMF. DMSO, DMAC, MP, HMPA, DMAC, DMF. | >550 | 0.15 [b]0.16 | 326 |
| Polymer III of Example VIII. | From diboronate ester, melt polymerization. From diboronic acid (in solution). | DMSO, DMAC, MP_____ DMAC, DMSO, MP_____ | 350–550 dec. | 0.13 0.09 | 271; 330 |

[a] DMSP = dimethylsulfoxide; MP = N-methylpyrrolidone; HMPA = hexamethylphosphoramide; DMAC = dimethylacetamide; DMF = dimethylformamide.
[b] After 8–10 weeks this polymer, which was originally nearly white, was brown. The viscosity had dropped to 0.10 but the infrared spectrum was identical to the earlier one.

As indicated in Table I all of the polymers were soluble. Although the inherent viscosities were not all determined at the same concentration in the same solvent it seems that the highest molecular weight polymer was obtained by melt polymerization in the case of Polymer I. Polymer II containing the less linear meta benzene linkages was prepared in dimethylacetamide solution. Polymer II remains in solution until polymerization is complete. It was possible to cast a film from a dimethylacetamide solution of Polymer II. The film was strong and transparent but it was somewhat brittle. Polymer II also had good adhesive properties.

All of the borimidazoline polymers were soluble in sulfuric acid and had inherent viscosities in the range of 0.1–0.35. When the compounds were reprecipitated by pouring sulfuric acid solution into a large excess of water, the infrared spectra indicated that hydrolysis had occurred. The infrared spectra for the benzborimidazoline polymers showed a strong, sharp bend close to 3500 cm.$^{-1}$ characteristic of N—H in this system. Thermogravimetric analysis (TGA) data for the polymers show Polymers I and II show good thermal stability up to 500–600° C. Polymer III begins to decompose at 300–400° C.

The foregoing detailed description has been given for clearness of understanding only, and no unnecessary limitations should be understood therefrom, as modifications will be obvious to those skilled in the art.

We claim:

1. A polyarylborimidazoline having repeating groups of the general formula:

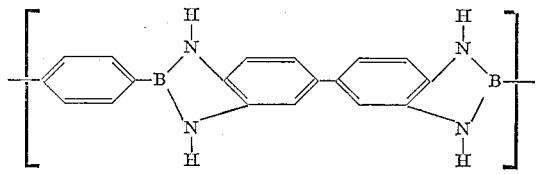

2. A polyarylborimidazoline having repeating groups of the general formula:

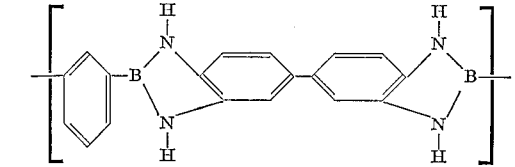

3. A polyarylborimidazoline having repeating groups of the general formula:

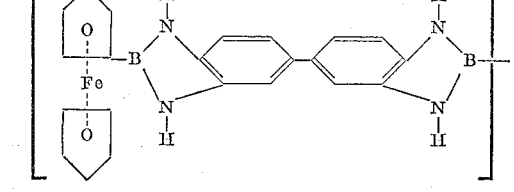

References Cited by the Examiner

Hoste: Anal. Chim. Acta, vol. 2, page 402 (1948).
Soloway: Journal American Chemical Society, vol. 82, pages 2442–4 (1960).
Bamford et al.: "S.C.I. Monograph," Nov. 13, 1960, pages 320–327.
Shechter et al.: Journal of Organic Chemistry, vol. 26, pages 1034–7, April 1961.

MURRAY TILLMAN, *Primary Examiner.*

HAROLD N. BURSTEIN, SAMUEL H. BLECH,
*Examiners.*

UNITED STATES PATENT OFFICE
CERTIFICATE OF CORRECTION

Patent No. 3,232,890                      February 1, 1966

Carl S. Marvel et al.

It is hereby certified that error appears in the above numbered patent requiring correction and that the said Letters Patent should read as corrected below.

Column 2, line 60, at the bottom of the closing bracket insert -- n --; columns 7 and 8, Table I, third column, the bracket should be repositioned to included lines 3, 4, 5 and 6 only; same Table I, footnote "a" for "DMSP" read -- DMSO --; column 8, lines 55 to 65, the lower left-hand portion of the formula should appear as shown below instead of as in the patent:

line 68, for "Nov. 13," read -- No. 13, --.

Signed and sealed this 10th day of January 1967.

(SEAL)
Attest:

ERNEST W. SWIDER                      EDWARD J. BRENNER
Attesting Officer                    Commissioner of Patents